United States Patent
Kim et al.

(10) Patent No.: US 11,493,442 B2
(45) Date of Patent: Nov. 8, 2022

(54) APPARATUS AND METHOD FOR MEASURING SURFACE OF ELECTRONIC DEVICE

(71) Applicants: SAMSUNG ELECTRONICS CO., LTD., Suwon-si (KR); 3D INDUSTRIAL IMAGING CO., LTD., Seoul (KR)

(72) Inventors: Jaeseon Kim, Suwon-si (KR); Kyunyeon Kim, Seoul (KR); Hyungbum Kim, Seoul (KR); Jongsu Lee, Suwon-si (KR); Youngjin Yi, Suwon-si (KR); Donghyeon Hwang, Suwon-si (KR)

(73) Assignees: SAMSUNG ELECTRONICS CO., LTD., Suwon-si (KR); 3D INDUSTRIAL IMAGING CO., LTD., Seoul (KR)

( * ) Notice: Subject to any disclaimer, the term of this patent is extended or adjusted under 35 U.S.C. 154(b) by 35 days.

(21) Appl. No.: 17/251,037

(22) PCT Filed: May 29, 2019

(86) PCT No.: PCT/KR2019/006424
§ 371 (c)(1),
(2) Date: Dec. 10, 2020

(87) PCT Pub. No.: WO2020/017755
PCT Pub. Date: Jan. 23, 2020

(65) Prior Publication Data
US 2021/0190684 A1  Jun. 24, 2021

(30) Foreign Application Priority Data
Jul. 20, 2018  (KR) .................. 10-2018-0084995

(51) Int. Cl.
*G01N 21/57*  (2006.01)
*G01N 21/27*  (2006.01)
(Continued)

(52) U.S. Cl.
CPC ............... *G01N 21/57* (2013.01); *G01J 3/50* (2013.01); *G01N 21/25* (2013.01); *G01N 21/274* (2013.01);
(Continued)

(58) Field of Classification Search
CPC ........ G01N 21/57; G01N 21/25; G01N 21/95; G01N 21/274; G01N 2201/0221; G01N 2201/0612; G01J 3/50
See application file for complete search history.

(56) References Cited

U.S. PATENT DOCUMENTS 6,249,348 B1  6/2001  Jung et al.
2001/0038451 A1  11/2001  Jung et al.
(Continued)

FOREIGN PATENT DOCUMENTS

JP  2001-264251  9/2001
JP  2001-281057  10/2001
(Continued)

OTHER PUBLICATIONS

English Machine translation of JP2001281057A (Year: 2001).*
(Continued)

*Primary Examiner* — Dominic J Bologna
(74) *Attorney, Agent, or Firm* — Nixon & Vanderhye, P.C.

(57) ABSTRACT

Various embodiments of the present invention relate to an apparatus and method for measuring the surface of an electronic device, the apparatus comprising: a seating portion on which the electronic device is seated; a first light source for irradiating first light on the surface of the elec-
(Continued)

tronic device; a first camera for photographing the surface using the first light; a second light source for irradiating second light on the surface of the electronic device; a second camera for photographing the surface using the second light; and an analyzer electronically connected to the first light source, the first camera, the second light source, and the second camera, wherein the analyzer is setup to analyze the color of the surface acquired using the first light source and the first camera; and the gloss of the surface acquired using the second light source and the second camera, so as to analyze the color and gloss of the surface of the electronic device using quantified and digitized data, thereby enabling quality inspection of the surface of the electronic device without deviation. Various other embodiments are possible.

15 Claims, 7 Drawing Sheets

(51) Int. Cl.
 *G01N 21/25* (2006.01)
 *G01N 21/95* (2006.01)
 *G01J 3/50* (2006.01)
(52) U.S. Cl.
 CPC ..... *G01N 21/95* (2013.01); *G01N 2201/0221* (2013.01)

(56) References Cited

U.S. PATENT DOCUMENTS

| | | | |
|---|---|---|---|
| 2001/0038453 | A1 | 11/2001 | Jung et al. |
| 2001/0043330 | A1 | 11/2001 | Jung et al. |
| 2004/0012785 | A1 | 1/2004 | Jung et al. |
| 2007/0211242 | A1* | 9/2007 | Okabe ................ G01N 21/8806 356/237.2 |
| 2009/0207245 | A1* | 8/2009 | Hayashi ............. G01N 21/9506 348/92 |
| 2010/0091269 | A1* | 4/2010 | Lex ........................ G01N 21/55 356/73 |
| 2011/0013197 | A1* | 1/2011 | Schwarz .............. G01N 21/898 356/601 |
| 2012/0147376 | A1 | 6/2012 | Jung et al. |
| 2012/0242826 | A1* | 9/2012 | Holmes ................ A61B 1/0638 348/E9.003 |
| 2013/0016340 | A1 | 1/2013 | Jung et al. |
| 2013/0208285 | A1 | 8/2013 | Miettinen et al. |
| 2016/0171748 | A1* | 6/2016 | Kohlbrenner .......... G01N 21/57 348/48 |
| 2017/0176336 | A1 | 6/2017 | Dimitriadis et al. |

FOREIGN PATENT DOCUMENTS

| | | |
|---|---|---|
| JP | 3216876 | 10/2001 |
| JP | 2003-28805 | 1/2003 |
| JP | 2013-532290 | 8/2013 |
| JP | 5323320 | 10/2013 |
| JP | 6201419 | 9/2017 |
| KR | 10-2007-0092607 | 9/2007 |

OTHER PUBLICATIONS

International Search Report for PCT/KR2019/006424 dated Aug. 28, 2019, 5 pages.
Written Opinion of the ISA for PCT/KR2019/006424 dated Aug. 28, 2019, 5 pages.

* cited by examiner

US 11,493,442 B2

APPARATUS AND METHOD FOR MEASURING SURFACE OF ELECTRONIC DEVICE

This application is the U.S. national phase of International Application No. PCT/KR2019/006424 filed May 29, 2019 which designated the U.S. and claims priority to KR Patent Application No. 10-2018-0084995 filed Jul. 20, 2018, the entire contents of each of which are hereby incorporated by reference.

FIELD

Various embodiments of the disclosure relate to an apparatus and a method for measuring a surface of an electronic device.

DESCRIPTION OF RELATED ART

As electronic devices, such as portable terminals, are increasingly used, electronic devices having various functions and surfaces are being provided.

Quality inspections, such as inspections of the color, the gloss, and the state of a surface of an electronic device, may be performed on the electronic device.

SUMMARY

Methods for inspecting the quality of a surface of an electronic device, for example, may include methods that use, for example, a spectrophotometer, a contact type gauge, and naked eyes.

The method for inspecting a surface of an electronic device by using the spectrophotometer requires a predetermined planar measurement section, and thus the shape and the area of the surface of the electronic device may be restricted.

The method for inspecting a surface of an electronic device by using the contact type gauge may generate a measurement error due to light introduced into the interior of the gauge or may generate a defect such as a scratch on a surface of the electronic device in an inspection process.

The method for inspecting a surface of an electronic device by the naked eyes may generate a human error and a personal error.

Various embodiments of the disclosure may provide an apparatus and a method for measuring a color and gloss of a surface of a measurement target (e.g., an electronic device).

In accordance with an aspect of the disclosure, there is provided an apparatus for measuring a surface of an electronic device, the apparatus including: a seating part, on which the electronic device is seated; a first light source configured to irradiate a first light onto the surface of the electronic device; a first camera configured to photograph the surface by using the first light; a second light source configured to irradiate a second light onto the surface of the electronic device; a second camera configured to photograph the surface by using the second light; and an analyzer electrically connected to the first light source, the first camera, the second light source, and the second camera, wherein the analyzer is configured to: analyze a color of the surface acquired by using the first light source and the first camera; and analyze gloss of the surface acquired by using the second light source and the second camera.

In accordance with another aspect of the disclosure, there is provided a method for measuring a surface of an electronic device, the method including: seating the electronic device on a seating part; irradiating a first light onto the surface of the electronic device by a first light source; acquiring a color image for the surface by using the first light by a first camera; deactivating the first light source and the first camera; irradiating a second light onto the surface by a second light source; acquiring a gloss image for the surface by using the second light by a second camera; and analyzing the acquired color image and the acquired gloss image by using an analyzer.

According to various embodiments of the disclosure, a quality inspection for a surface of a measurement target (e.g., an electronic device) can be performed without deviation by analyzing a color and gloss of the surface of the measurement target by using quantified and digitized data.

DETAILED DESCRIPTION OF EXAMPLE EMBODIMENTS

Figure 1:
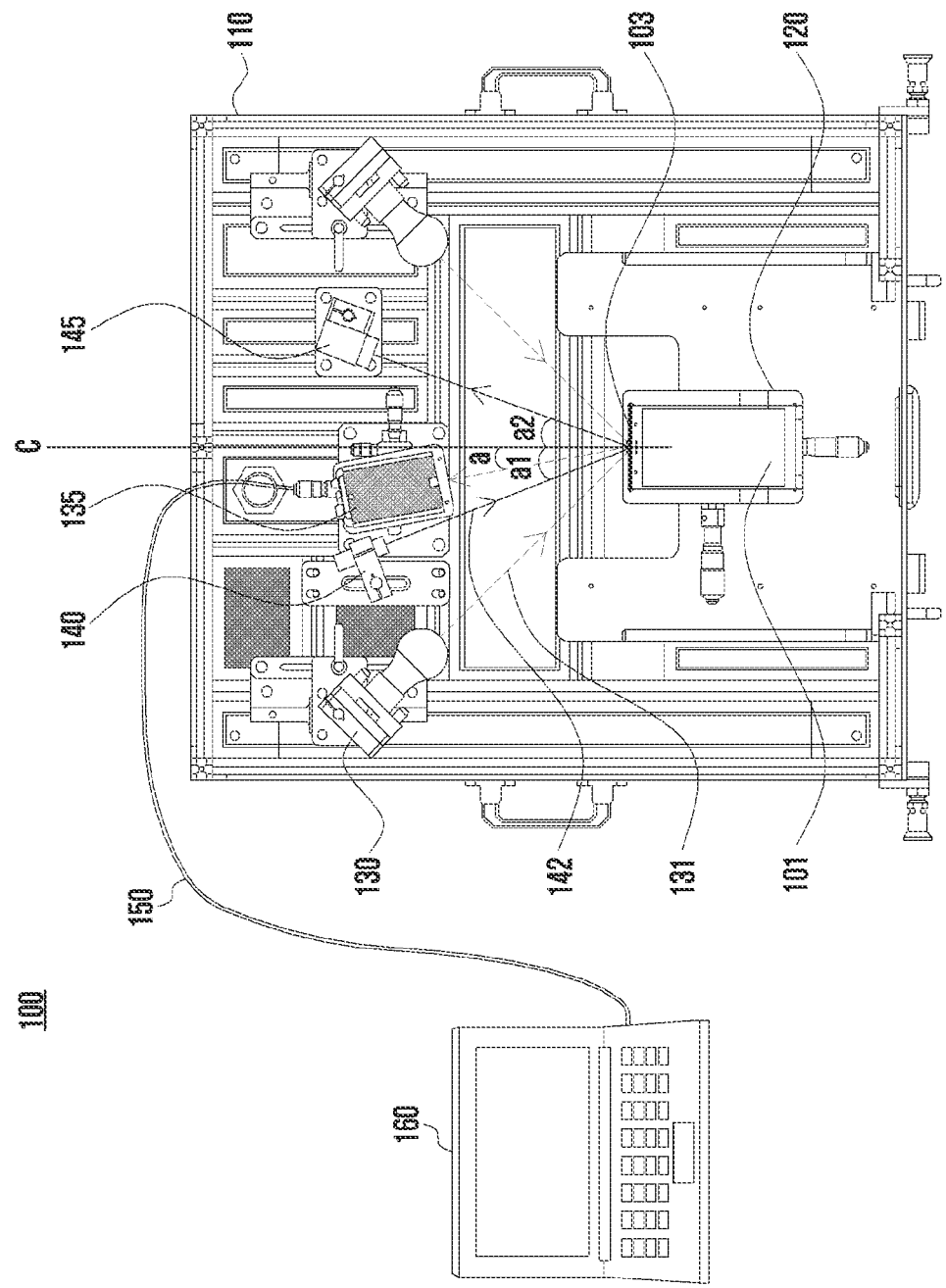
FIG. 1 is a view schematically illustrating an apparatus for measuring a surface of an electronic device according to various embodiments of the disclosure.

Various embodiments of the disclosure and the terms used herein do not limit the technical features described in the disclosure to specific embodiments, and should be construed to include various modifications, equivalents, or replacements of the embodiments.

With regard to the description of the drawings disclosed in the disclosure, similar reference numerals may be used to refer to similar or related elements. It is to be understood that a singular form of a noun corresponding to an item may include one or more of the things, unless the relevant context clearly indicates otherwise.

An electronic device according to embodiments of the disclosure may include electronic devices of various forms. The electronic devices, for example, may include a portable communication device (e.g., a smart phone), a computer device, a portable multimedia device, a portable medical device, a camera, a wearable device, or a home appliance. An electronic device according to various embodiments of the disclosure is not limited to the above-mentioned devices.

Hereinafter, an apparatus and a method for measuring a surface of an electronic device according to various embodiments of the disclosure will be described with reference to the accompanying drawings.

FIG. 1 is a view schematically illustrating an apparatus for measuring a surface of an electronic device according to various embodiments of the disclosure.

Referring to FIG. 1, an apparatus 100 for measuring a surface of an electronic device 101 according to various embodiments of the disclosure may include a housing 110, a seating part 120, a first light source 130, a first camera 135, a second light source 140, a second camera 145, a connector 150, and an analyzer 160.

According to various embodiments, the housing 110 may include the electronic device 101 that is a measurement target, the seating part 120, the first light source 130, the first camera 135, the second light source 140, and the second camera 145 in the interior thereof. The housing 110 may be sealed such that external light is shielded when a surface 103 of the electronic device 101 is photographed by using the first camera 135 and the second camera 145.

According to various embodiments, the seating part 120 may be disposed at a first location (e.g., the center of a lower side of the housing 110) in the housing 110. The electronic device 101 may be seated on the seating part 120 so that the surface 103 is measured.

According to various embodiments, the first light source 130 may be disposed at a second location (e.g., a left upper side or a right upper side of the housing 110) in the housing 110. One or more first light sources 130 may be disposed. The first light source 130 may irradiate a first light 131 onto the surface 103 of the electronic device 101. The first light 131 may be lighting including at least one of a visual ray, an ultraviolet ray, or an infrared ray. The brightness of the first light 131, for example, may be set to 500 Lux to 1500 Lux. The color temperature of the first light 131, for example, may be set to 5000 K, 5700 K, 6500 K, and 7000 K.

According to various embodiments, the first camera 135 may be disposed at a third location (e.g., a left upper side of the housing 110) in the housing 110. The first camera 135 may photograph the surface 103 of the electronic device 101 by using the first light 131 irradiated from the first light source 130. The first camera 135 may include a color camera.

Figure 2:
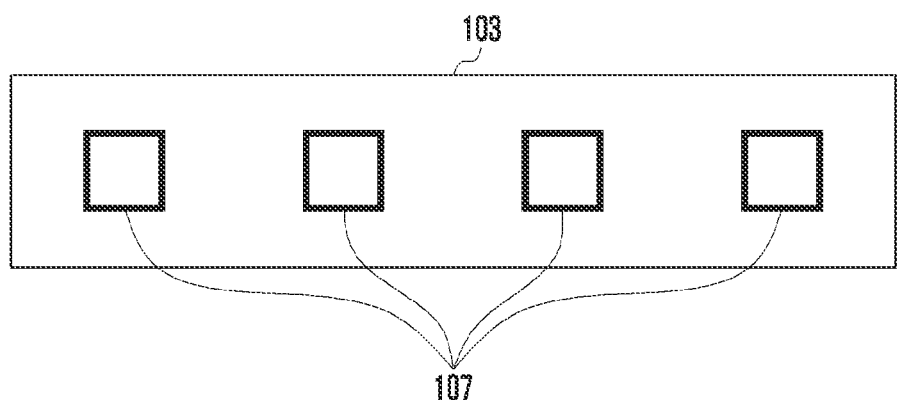
FIG. 2 is a view illustrating specified areas of interest on a surface of an electronic device according to various embodiments of the disclosure.

According to an embodiment, the first camera 135, as illustrated in FIG. 2, may provide a captured image for the one or more areas 107 of interest specified on the surface 103 of the electronic device 101 to the analyzer 160.

According to an embodiment, the first light source 130 and the first camera 135 may photograph a color of the surface 103 of the electronic device 101. The captured color image may be transmitted to the analyzer 160 for measurement. The first light may be irradiated from the first light source 130 onto the surface 103 of the electronic device 101, and the first camera 135 may be disposed such that a highlight of the first light 131 reflected from the surface 103 is avoided. For example, the first camera 135 may be located such that an angle of reflection corresponding to the incident angle of the first light 131 deviates from an imaginary center line C by a predetermined angle a (e.g., about 1° to 10°). The disposition of the first light source 130 and the first camera 135 is not limited to the second location and the third location, which have been described above, and the first light source 130 and the first camera 135 may be disposed at various locations.

According to various embodiments, the second light source 140 may be disposed at a fourth location (e.g., a left upper side of the housing 110) in the housing 110. The second light source 140 may irradiate a second light 142 onto the surface 103 of the electronic device 101. The second light 142 may be one or more laser beams.

According to various embodiments, the second camera 145 may be disposed at a fifth location (e.g., a right upper side of the housing 110) in the housing 110. The second camera 145 may photograph the surface 103 of the electronic device 101 by using the second light 142 irradiated from the second light source 140. The second camera 145 may include a black-and-white camera.

According to an embodiment, the second light source 140 and the second camera 145 may photograph the gloss of the surface 103 of the electronic device 101. The captured gloss image may be transmitted to the analyzer 160 for measurement.

The second camera 145 may be disposed at a 1-1-th location (e.g., a left upper side) and a 1-2-th location (e.g., a right upper side) at the same angle with respect to the imaginary center line C. For example, the locations of the second light source 140 and the second camera 145 may be determined such that the incident angle a1 of the second light source 142 and the angle of location corresponding to the incident angle a1 of the second light source 142 with respect to the imaginary center line C are the same. The disposition of the second light source 140 and the second camera 145 is not limited to the fourth location and the fifth location, which have been described above, and the second light source 140 and the second camera 145 may be disposed at various locations.

According to an embodiment, when the second light source 140 and the second camera 145 are activated and the gloss of the surface 103 of the electronic device 101 is measured, the first light source 130 and the first camera 135 may be deactivated such that an interference between the second light source 140 and the second camera 145 is avoided.

Figure 3:
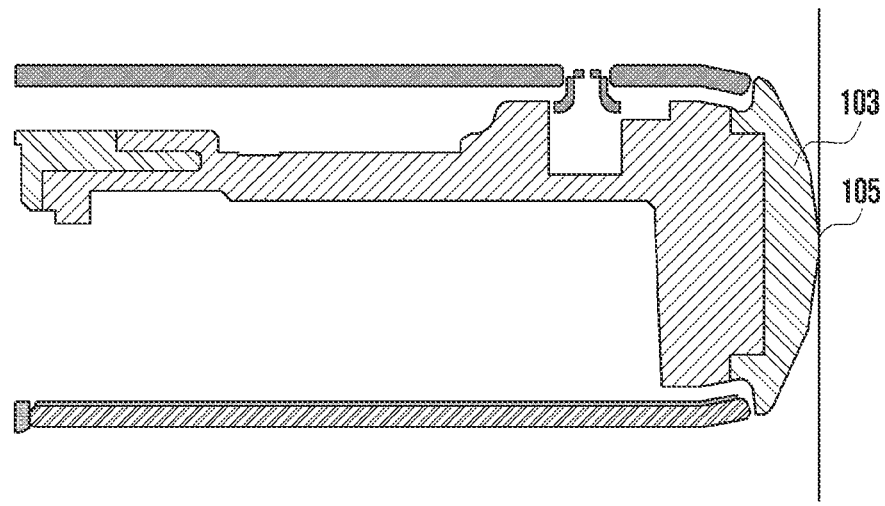
FIG. 3 is a view illustrating that a first light source, a first camera, a second light source, and a second camera are located on a plane that is perpendicular to a tangential direction of a surface of an electronic device according to various embodiments of the disclosure.

According to an embodiment, the first light source 130, the first camera 135, the second light source 140, and the second camera 145, as illustrated in FIG. 3, may be located on a plane that is perpendicular to a tangential direction 105 of the surface 103 of the electronic device 101.

According to an embodiment, the first camera 135 and the second camera 145 may include one or more lenses, one or more image sensors, an image signal processor, or a flash (e.g., an LED or a xenon lamp).

According to various embodiments, the connector 150 may electrically connect the first light source 130, the first camera 135, the second light source 140, and the second camera 145 to the analyzer 160. The connector 150 may include at least one of a high definition multimedia interface (HDMI), a universal serial bus (USB) interface, or an SD card interface. According to an embodiment, the connector 150 may be replaced by a wireless LAN (Wi-Fi) or Bluetooth.

According to various embodiments, the analyzer 160 may analyze the measured color of the surface 103 of the electronic device 101 by using the first light source 130 and the first camera 135. The analyzer 160 may analyze the measured gloss of the surface 103 of the electronic device 101 by using the second light source 140 and the second camera 145. When the gloss of the surface 103 is analyzed, the analyzer 160 may use a color analysis value acquired by using the first camera 135 and a gloss analysis value acquired by using the second camera 145.

Figure 4:
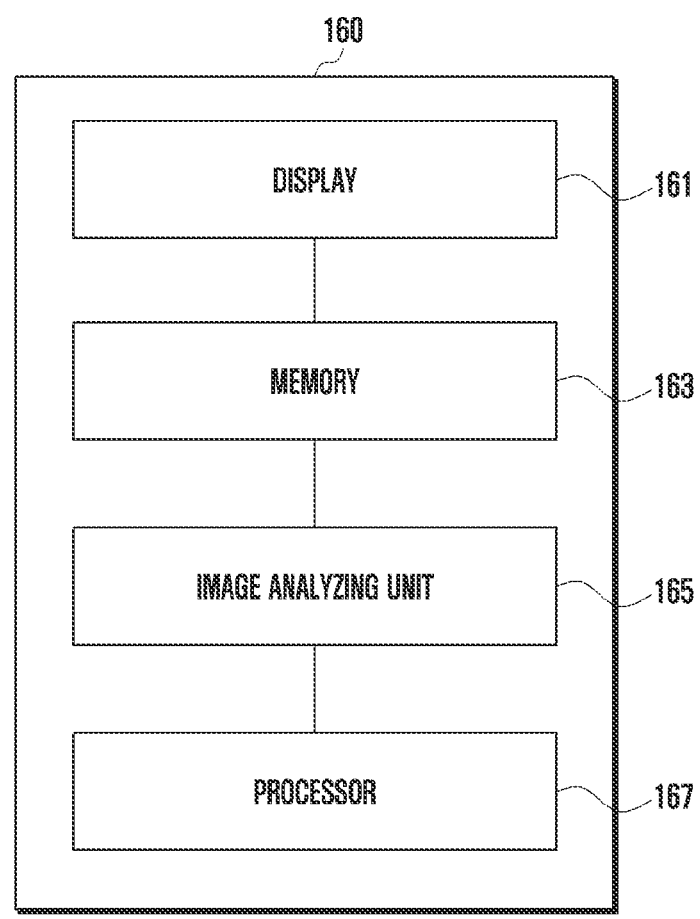
FIG. 4 is a view schematically illustrating a configuration of an analyzer of an apparatus for measuring a surface of an electronic device according to various embodiments of the disclosure.

FIG. 4 is a view schematically illustrating a configuration of an analyzer of an apparatus for measuring a surface of an electronic device according to various embodiments of the disclosure.

Referring to FIG. 4, an analyzer 160 according to various examples of the disclosure may include a display 161, a memory 163, an image analyzing unit 165, and a processor 167.

According to various embodiments, the display 161 may set the brightness and the color temperature of the lighting for the first light 131 of the first light source 130. The display 161 may set the intensity of the laser beam for the second light 142 of the second light source 140. When the second light source 140 and the second camera 145 are activated and the gloss of the surface 103 of the electronic device 101 is measured, the display 161 may be configured such that the first light source 130 and the first camera 135 are deactivated. The display 161 may display a measurement or inspection result for the surface 103 of the electronic device 101.

According to an embodiment, the display 161 may perform an input function and a display function. The display 161 may include a touch panel and a display part. The touch panel may detect a touch input of a user, and may generate a detection signal and transmit the detection signal to the processor 167. The display part may visually provide a menu of the measurement apparatus 100, input data, function setting information, and other various pieces of information to the user.

According to various embodiments, the memory 163 may store reference values for the surface 103 of the electronic device 101. For example, the memory 163 may store a reference color value and a reference gloss value for the surface 103 of the electronic device 101. The reference color value may be compared with the measured color by using the first light source 130 and the first camera 135. The reference gloss value may be compared with the measured gloss by using the second light source 140 and the second camera 145.

According to an embodiment, the memory 163 may function to store a program for processing and controlling the processor 167, an operating system (OS), various applications, and input/output data, and may store a program that controls an overall operation of the measurement apparatus 100. The memory 163 may store a user interface (UI) provided by the measurement apparatus 100 and various pieces of setting information that are necessary when the measurement apparatus 100 processes the functions.

According to various embodiments, after analyzing R, G, and B values of the color image for the surface 103 of the electronic device 101, which was captured by using the first camera 135, the image analyzing unit 165 may calculate an average value thereof. The calculated average value may be quantified and digitized. The average value of the R, G, and B values, for example, may be converted by at least one of a CIE XYZ, xyY, L*u*v*, and L*a*b color system, a CMYK color system, or a YUV, HLS, and HIS system. The image analyzing unit 165 may calculate an average value of the gloss images for the surface 103 of the electronic device 101 captured by using the second camera 145. The calculated average value may be quantified and digitized.

According to various embodiments, the processor 167 may be connected to the display 161, the memory 163, and the image analyzing unit 165 to control the functions and the operations thereof. The processor 167 may perform an overall operation related to a process for measuring the surface 103 of the electronic device 101 according to various embodiments of the disclosure.

According to an embodiment, the processor 167 may control an overall operation of the analyzer 160 and flows of signals between the internal elements thereof, and may perform a function of processing data. The processor 167, for example, may include a central processing unit (CPU), an application processor, and a communication processor. The processor 167 may be a single core processor or a multi-core processor, and may include one or more processors.

Figure 5:
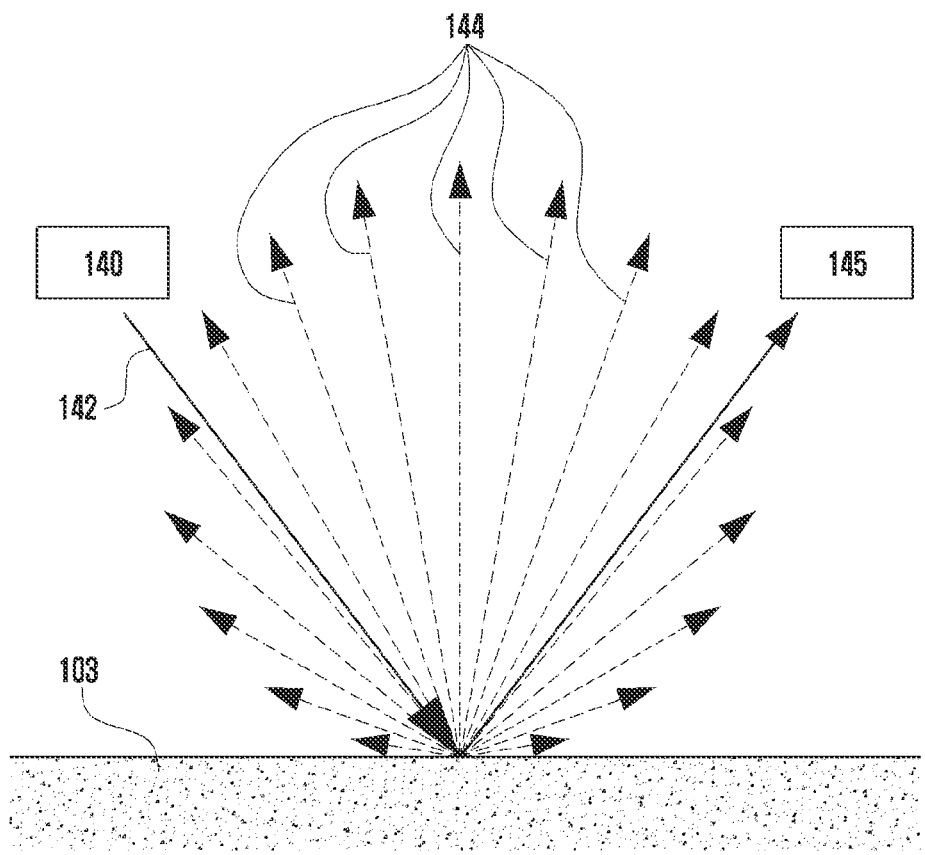
FIG. 5 is a view illustrating a principle of measuring a gloss by using a second camera of an apparatus for measuring a surface of an electronic device according to various embodiments of the disclosure.

FIG. 5 is a view illustrating a principle of measuring a gloss by using a second camera of an apparatus for measuring a surface of an electronic device according to various embodiments of the disclosure.

According to an embodiment, the surface 103 of the electronic device 101 manufactured by using an anodizing method may have a unique color and unique gloss according to a roughness state, the thickness of an oxidized film, and a color colored on the oxidized film thereof.

Referring to FIG. 5, when determining when the gloss of the surface 103 of the electronic device 101 is high or low, the gloss of the surface 103 may be high when the amount of the second light 142 irradiated from the second light source 140, which is specular-reflected to the second camera 145 as compared with the amount of the second light 142 input onto the surface 103 of the electronic device 101, is high. Meanwhile, when the second light 142 irradiated from the second light source 140 is input onto the surface 103 of the electronic device 101 and then is reflected, the gloss of the surface 103 may become lower as the ratio of scattering light 144 becomes higher.

According to various embodiments, by using the principle described with reference to FIG. 5, the second light 142 (e.g., the laser beam) input onto the surface 103 of the electronic device 101 may scatter according to the states, such as the color of the surface 103 and the surface roughness of the surface 103, generating a unique speckle pattern. The information on the surface 103 of the electronic device 101 may be digitized by using the second camera 145.

Figure 6:
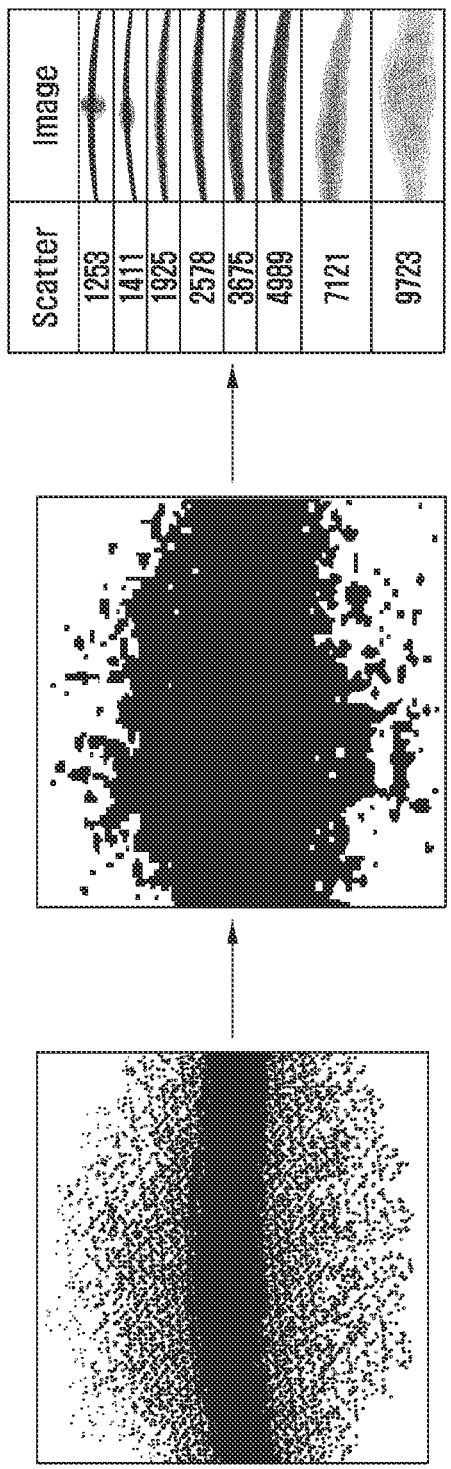
FIGS. 6A, 6B, and 6C are views illustrating a method for digitizing information on a surface of an electronic device according to various embodiments of the disclosure.

For example, a method for digitizing surface information on the surface 103 of the electronic device 101 will be described with reference to FIG. 6.

FIGS. 6A to 6C is a view illustrating a method for digitizing information on a surface of an electronic device according to various embodiments of the disclosure.

Referring to FIG. 6A, the analyzer 160 may receive a gloss image for the surface 103 of the electronic device 101, to which the second light 142 irradiated from the second light source 140 is input, by using the second camera 145, and may provide a threshold value to the gloss image.

Referring to FIG. 6B, the analyzer 160 may analyze a speckle pattern by converting the gloss image, to which the threshold value is provided, to 2-digit values.

Referring to FIG. 6C, the analyzer 160 may calculate an average scattering value for an image of an effective area for the analyzed speckle pattern and may digitize the gloss for the surface 103.

Figure 7:
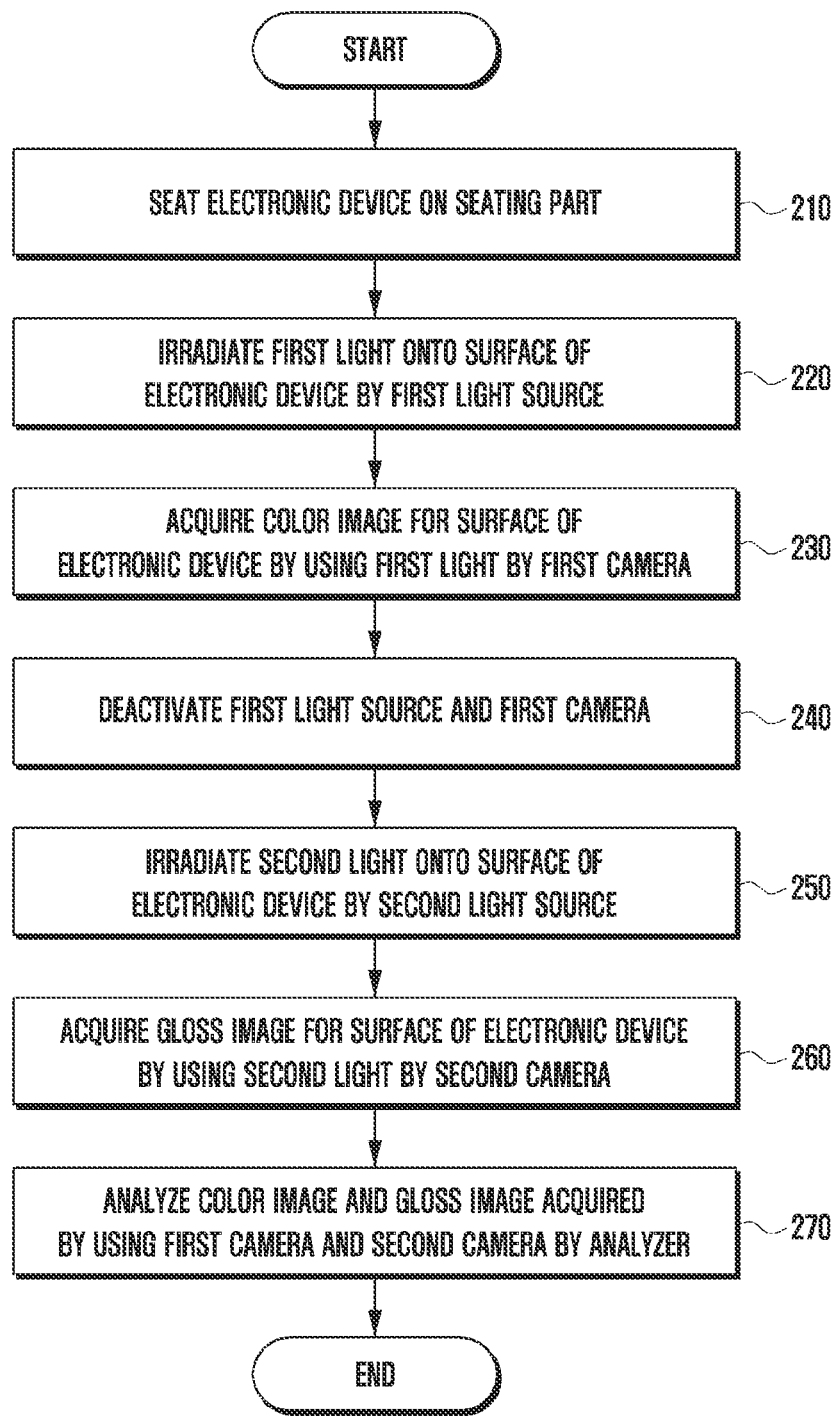
FIG. 7 is a flowchart illustrating a method for measuring a surface of an electronic device according to various embodiments of the disclosure.

FIG. 7 is a flowchart illustrating a method for measuring a surface of an electronic device according to various embodiments of the disclosure.

The processes described with reference to FIG. 7, for example, may be executed by the elements described by the measurement device 100 of FIG. 1.

In operation 210, the electronic device 101 that is a measurement target may be seated on the seating part 120 of the housing 110.

In operation 220, the first light source 130 may irradiate a first light 131 onto the surface 103 of the electronic device 101.

In operation 230, the first camera 135 may acquire a color image for the surface 103 of the electronic device 101 by using the first light 131.

In operation 240, the first light source 130 and the first camera 135 may be deactivated.

In operation 250, the second light source 140 may irradiate a second light 142 onto the surface 103 of the electronic device 101.

In operation 260, the second camera 145 may acquire a gloss image for the surface 103 of the electronic device 101 by using the second light 142.

In operation 270, the analyzer 160 may analyze the color image and the gloss image acquired by using the first camera 135 and the second camera 145 and may digitize them.

Accordingly, according to the apparatus and the method for measuring a surface of an electronic device according to various embodiments of the disclosure, because digitized data of the color and the gloss of the surface of the electronic device can be acquired, a quality inspection for the surface of the electronic device can be performed without deviation.

Although the disclosure has been described according to various embodiments of the disclosure until now, it will be apparent to an ordinary person in the art that changes and modifications may be made without departing from the technical spirit of the disclosure.

What is claimed is:

1. A method for measuring a surface of an electronic device, the method comprising:
    placing the electronic device in a holder;
    irradiating a first light onto the surface of the electronic device by a first light source;
    acquiring a color image for the surface by using the first light by a first camera;
    deactivating the first light source and the first camera to avoid interference with a second light source and a second camera;
    activating the second light source and the second camera;
    irradiating a second light onto the surface by the second light source;
    acquiring a gloss image for the surface by using the second light by the second camera; and
    analyzing the acquired color image and the acquired gloss image by using an analyzer.

2. The method of claim 1, wherein the first light comprises at least one of a visual ray, an ultraviolet ray, or an infrared ray.

3. The method of claim 1, wherein the first light source, the first camera, the second light source, and the second camera are located on a plane that is perpendicular to a tangential direction of a curved portion of the surface.

4. The method of claim 1, wherein the second light source and the second camera are disposed on a left upper side and a right upper side of an imaginary central line at the same angle.

5. The method of claim 1, wherein the first camera is located to deviate from an angle of reflection corresponding to an incident angle of the first light by a predetermined angle such that a highlight of the first light irradiated from the first light source is avoided.

6. The method of claim 1, wherein the first camera provides a captured image for one or more specified areas of interest onto the surface.

7. An apparatus for measuring a surface of an electronic device, the apparatus comprising:
    a holder configured to hold the electronic device;
    a first light source configured to irradiate a first light onto the surface of the electronic device;
    a first camera configured to photograph the surface by using the first light;
    a second light source configured to irradiate a second light onto the surface of the electronic device;
    a second camera configured to photograph the surface by using the second light; and
    an analyzer electrically connected to the first light source, the first camera, the second light source, and the second camera through a connector,
    wherein the analyzer is configured to:
        control the first light source to irradiate the first light onto the surface;
        control the first camera to acquire a color image for the surface;
        deactivate the first light source and the first camera to avoid interference with the second light source and the second camera;
        activate the second light source and the second camera;
        control the second light source to irradiate the second light onto the surface;
        control the second camera to acquire a gloss image for the surface;
        analyze the color image of the surface acquired by using the first light source and the first camera; and
        analyze the gloss image of the surface acquired by using the second light source and the second camera.

8. The apparatus of claim 7, wherein the first light comprises at least one of a visual ray, an ultraviolet ray, or an infrared ray.

9. The apparatus of claim 7, wherein the first light source, the first camera, the second light source, and the second camera are located on a plane that is perpendicular to a tangential direction of a curved portion of the surface, and wherein the second light source and the second camera are disposed on a left upper side and a right upper side of an imaginary central line at the same angle.

10. The apparatus of claim 7, wherein the first camera is a color camera and the second camera is a black-and-white camera.

11. The apparatus of claim 7, further comprising:
    a housing,
    wherein the holder is disposed at a first location in the housing,
    wherein the first light source is disposed at a second location in the housing,
    wherein the first camera is disposed at a third location in the housing,
    wherein the second light source is disposed at a fourth location in the housing, and
    wherein the second camera is disposed at a fifth location in the housing.

12. The apparatus of claim 11, wherein the housing is sealed such that external light is shielded when the surface is photographed by using the first camera and the second camera.

13. The apparatus of claim 7, wherein the first camera is located to deviate from an angle of reflection corresponding to an incident angle of the first light by a predetermined angle such that a highlight of the first light irradiated from the first light source is avoided.

14. The apparatus of claim 7, wherein the first camera provides a captured image for one or more specified areas of interest onto the surface.

15. The apparatus of claim 7, wherein, when the gloss image of the surface is analyzed, a color analysis value acquired using the first camera and a gloss analysis value acquired using the second camera are used.

\* \* \* \* \*